United States Patent
Taniguchi et al.

(10) Patent No.: US 6,824,263 B2
(45) Date of Patent: Nov. 30, 2004

(54) WATER BASE INK SET FOR INK-JET RECORDING

(75) Inventors: Akihiko Taniguchi, Nagoya (JP); Masashi Tsuda, Aichi-ken (JP); Shunichi Higashiyama, Yotsukaichi (JP); Masaya Fujioka, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/261,999

(22) Filed: Oct. 1, 2002

(65) Prior Publication Data

US 2003/0098905 A1 May 29, 2003

(30) Foreign Application Priority Data

Oct. 1, 2001 (JP) .......................................... 2001-305336
Oct. 1, 2001 (JP) .......................................... 2001-305337

(51) Int. Cl.[7] ........................... G01D 11/00; C09D 11/00
(52) U.S. Cl. ..................................... 347/100; 106/31.27
(58) Field of Search ................ 347/100, 96; 106/31.27, 106/31.13

(56) References Cited

U.S. PATENT DOCUMENTS 4,279,653 A * 7/1981 Makishima et al. ..... 106/31.32
5,911,815 A * 6/1999 Yamamoto et al. ...... 106/31.27

* cited by examiner

Primary Examiner—Michael S. Brooke
(74) Attorney, Agent, or Firm—Reed Smith LLP

(57) ABSTRACT

A water base ink set for ink-jet recording comprises a first ink which contains an anionic dye, and a second ink which contains a cationic dye. At least one of the first and second inks contains at least two glycols selected from the group consisting of diethylene glycol, triethylene glycol, and polyethylene glycol, polyvinyl pyrrolidone, and water. The ink set makes it possible to stably discharge the ink by means of an ink-jet head, and it realizes vivid recording which is highly reliable and highly accurate and which provides good color balance.

19 Claims, 4 Drawing Sheets

WATER BASE INK SET FOR INK-JET
RECORDING

BACKGROUND OF THE INVENTION

1. Field of the Invention

The present invention relates to a water base ink set for ink-jet recording to be used for an ink-jet recording apparatus, the ink-jet recording apparatus including the same, and an ink-jet recording method.

2. Related Art

The ink-jet recording system is a recording system that inks of several colors, which constitute basic colors, are converted into minute droplets of several picoliters to several tens of picoliters by using an ink discharge method including, for example, the bubble method in which the ink is discharged from a minute nozzle in accordance with the action of bubbles generated by rapid heating, and the piezoelectric method in which the ink is discharged from a minute nozzle in accordance with the action of a piezoelectric element that is deformable depending on an applied voltage so that the minute droplets are selectively landed on a paper surface to form an image thereby.

The ink-jet recording system is excellent in that it is possible to reproduce colors approximate to those of the full color and form an image having no granular texture by highly accurately controlling the discharge of minute droplets, making it possible to realize a high text printing quality and a high photographic printing quality. However, in order to discharge the minute droplets with such a high degree of accuracy, it is required to use a highly accurate landing control technique based on the use of a sufficiently thin discharge nozzle. Further, it is required to remove any dust and impurities from the ink. Therefore, it is necessary that the water base ink for ink-jet recording is subjected to precision filtration, and sufficiently washed materials are used for all parts which make contact with the ink.

Most of typical full color ink-jet printers, which use the ink set composed of four colors of black, yellow, magenta, and cyan, use the ink containing the anionic dye in view of the coloring performance on the paper and the toxicity. However, the ink containing the anionic dye is insufficient in vividness, for example, especially in the case of the yellow color. It is demanded to obtain a more vivid color. In order to satisfy such a demand, it is preferable to use the cationic dye which is used for a marker pen or the like and which has vivid color development performance. On the other hand, each of single colors of the inks containing the cationic dyes is vivid. However, if the inks containing the cationic dyes are used for all inks, it is hard to say that they are suitable in view of the balance of colors. Therefore, in order to obtain an image which is vivid and which is excellent in color balance, it is preferable to use the ink containing the anionic dye and the ink containing the cationic dye in combination.

However, if the ink containing the anionic dye and the ink containing the cationic dye are used in combination, it is feared that the inks may be mixed with each other at the head discharge portion, and any insoluble inorganic salt may be produced, or any deposit may be formed due to the deposition or precipitation of the dye, because the head discharge portions for the respective colors of the ink-jet printer are arranged closely on an identical plane, and an identical wiper is used for the head discharge portions for the respective colors in order to clean the head discharge portions. The amount of produced deposit differs depending on, for example, the type and the concentration of the dye and the type and the concentration of the solvent. However, when the deposit is formed, then any clog-up occurs at the head discharge portion, and it is impossible to highly accurately control the discharge landing.

An ink-jet recording apparatus, which has only a single head, is provided with a single ink tank (or an ink cartridge) as well. Therefore, such an ink-jet recording apparatus can use only unicolor ink in ordinary cases. When the ink contained in the ink tank is consumed, it is necessary that the empty ink tank is exchanged with another tank filled with an ink. For example, when an ink contained in the tank filled with the anionic dye ink is exhausted, an user intends to use a cationic dye ink next time in some cases. In such a situation, it is necessary that the ink container, which was filled with the anionic dye ink, is detached from the ink-jet head, and the ink container, which is filled with the cationic dye ink, is attached thereto. During this process, if any anionic dye ink remains in the ink-jet head, it is feared that the anionic dye ink may be mixed with the cationic dye ink allowed to inflow into the head, and any insoluble inorganic salt may be produced, or any deposit may be formed due to the deposition or precipitation of the dye. The amount of produced deposit differs depending on, for example, the type and the concentration of the dye and the type and the concentration of the solvent. However, when the deposit is produced, then any clog-up occurs at the head filter and the nozzle, and it is impossible to highly accurately control the discharge landing.

In the case of the conventional method, when the problem as described above occurs, it has been necessary to perform a treatment such that the ink (or the ink tank) is exchanged after substituting the interior of the head with a washing solution or the like so that the anionic dye ink and the cationic dye ink are not mixed with each other. However, such a procedure takes a long period of time. Further, another problem arises such that large amounts of the ink and the washing solution or the like are required.

SUMMARY OF THE INVENTION

The present invention has been made in order to solve the problems involved in the conventional technique as described above, a first object of which is to provide a water base ink set for ink-jet recording which makes it possible to perform stable discharge without any occurrence of clog-up at the head discharge portion and which makes it possible to perform vivid recording with high reliability, high accuracy, and good color balance even when an ink containing an anionic dye and an ink containing a cationic dye are used in combination, and an ink-jet recording apparatus which accommodates the ink set.

A second object of the present invention is to provide an ink-jet recording method which makes it possible to perform stable discharge without any occurrence of clog-up at the head filter and the nozzle and which makes it possible to perform highly reliable and highly accurate recording even when an anionic dye ink and a cationic dye ink are used in combination.

According to a first aspect of the present invention, there is provided a water base ink set for ink-jet recording comprising:

a first ink which contains an anionic dye; and
a second ink which contains a cationic dye, wherein:
at least one of the first and second inks contains at least two glycols selected from the group consisting of diethylene glycol, triethylene glycol, and polyethylene glycol, polyvinyl pyrrolidone, and water.

In the water base ink set for ink-jet recording, the first ink and the second ink may have different colors. The ink set may further comprise third and fourth inks. In this case, the first to fourth inks may have mutually different colors. For example, the second ink may have a yellow color, and the first ink may have a black, magenta, or cyan color.

In the water base ink set for ink-jet recording, the first ink and the second ink may have an identical color. In this case, an user can select the ink containing the anionic dye and the ink containing the cationic dye depending on the information to be recorded, for example, depending on the combination of colors. The water base ink set for ink-jet recording may further comprise a third ink which contains an anionic dye having a color different from that of the first ink, and a fourth ink which contains a cationic dye having the same color as that of the third ink, wherein at least one of the third and fourth inks contains at least two glycols selected from the group consisting of diethylene glycol, triethylene glycol, and polyethylene glycol, polyvinyl pyrrolidone, and water. For example, the ink set may comprise the inks containing the anionic dyes having four colors of black, yellow, magenta, and cyan, and the inks containing the cationic dyes having four colors of black, yellow, magenta, and cyan. In this case, an user can appropriately select the ink containing the anionic dye and the ink containing the cationic dye for each of the colors.

According to a second aspect of the present invention, there is provided an ink-jet recording apparatus comprising:

an ink-jet head which ejects an ink onto a recording medium;

a carriage which holds the ink-jet head and which is movable opposingly with respect to the recording medium; and an water base ink set for ink-jet recording, wherein:

the ink set comprises a first ink which contains an anionic dye, and a second ink which contains a cationic dye, and at least one of the first and second inks contains at least two glycols selected from the group consisting of diethylene glycol, triethylene glycol, and polyethylene glycol, polyvinyl pyrrolidone, and water.

In the ink set and the ink-jet recording apparatus of the present invention, the ink set may be in a form of ink cartridge which is connectable to the ink-jet head and which is replaceable. The first ink and the second ink may have different colors. Alternatively, the first ink and the second ink may have an identical color. The ink cartridges may be independent containers for the respective inks. Alternatively, the ink cartridge may be one container provided with compartments for accommodating the inks of different colors, respectively.

According to a third aspect of the present invention, there is provided an ink-jet recording method for discharging an ink contained in an ink container onto a recording medium from an ink-jet head, the method comprising:

performing recording by connecting, to the ink-jet head, one of a first ink container filled with a first ink containing an anionic dye and a second ink container filled with a second ink containing a cationic dye; and performing recording by connecting, to the ink-jet head, the other of the first and second ink containers in place of the one ink container, wherein:

at least one of the first and second inks contains at least two glycols selected from the group consisting of diethylene glycol, triethylene glycol, and polyethylene glycol, polyvinyl pyrrolidone, and water. According to the ink-jet recording method of the present invention, the first ink can be replaced with the second ink contained in the second ink container, depending on the situation to perform the recording or after the first ink is exhausted. During this process, it is unnecessary to wash the ink flow passage in the head. The first ink and the second ink may have different colors. Alternatively, the first ink and the second ink may have an identical color.

BRIEF DESCRIPTION OF THE DRAWINGS

An embodiment of the invention will be described in detail with reference to the following figures wherein.

DESCRIPTION OF THE PREFERRED EMBODIMENTS

Figure 1:
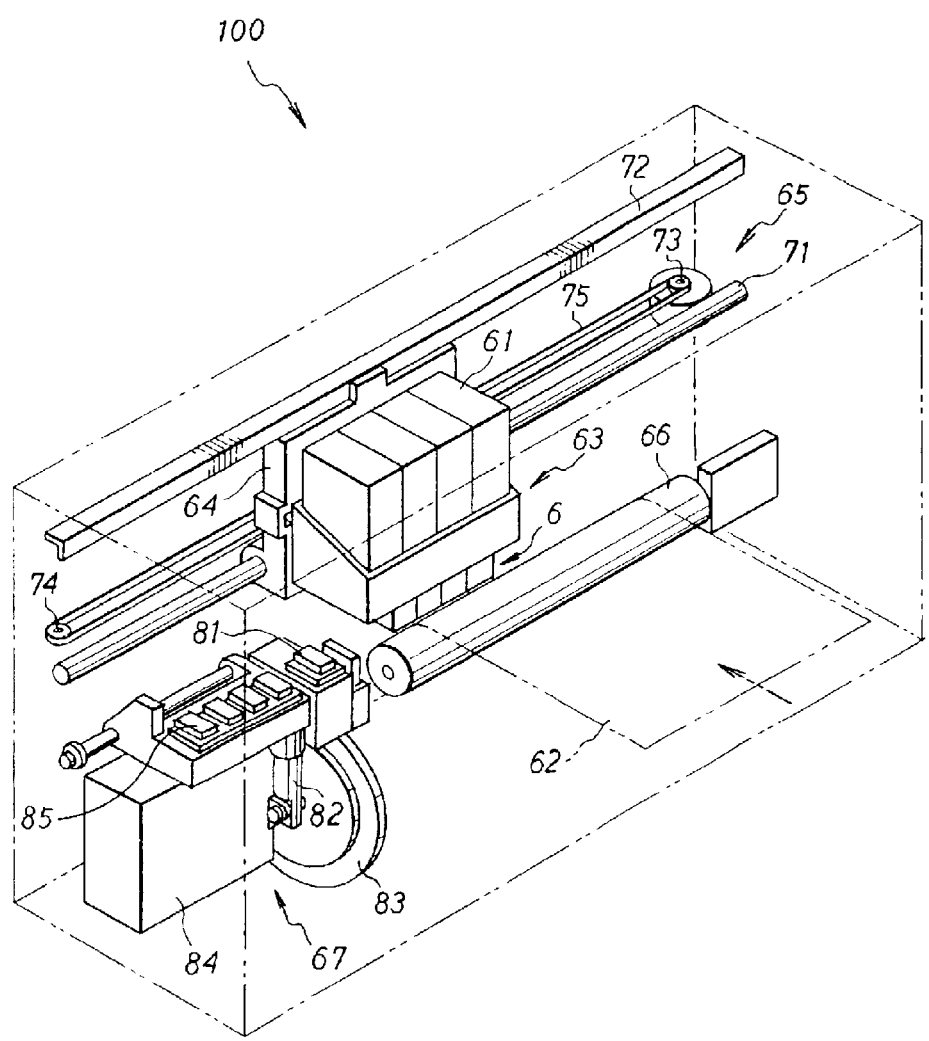
FIG. 1 is a perspective view showing a color ink-jet printer having an ink cartridge which contains ink set prepared in examples of the invention.

The water base ink set for ink-jet recording of the present invention is composed of inks of a plurality of colors, and it includes at least one of the ink containing the anionic dye and at least one of the ink containing the cationic dye.

The anionic dye is not specifically limited. The anionic dye may include, for example, C. I. Direct Yellow 8, 11, 12, 27, 28, 33, 39, 44, 50, 58, 85, 86, 87, 88, 89, 98, 100, 110, 132; C. I. Acid Yellow 1, 3, 7, 11, 17, 23, 25, 29, 36, 38, 40, 42, 44, 76, 98, 99; C. I. Reactive Yellow 2, 3, 17, 25, 37, 42; C. I. Food Yellow 3; C. I. Direct Red 2, 4, 9, 11, 20, 23, 24, 31, 39, 46, 62, 75, 79, 80, 83, 89, 95, 197, 201, 218, 220, 224, 225, 226, 227, 228, 229, 230; C. I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265, 289; C. I. Reactive Red 7, 12, 13, 15, 17, 20, 23, 24, 31, 42, 45, 46, 59; C. I. Food Red 87, 92, 94; C. I. Direct Blue 1, 15, 22, 25, 41, 76, 77, 80, 86, 90, 98, 106, 108, 120, 158, 163, 168, 199, 226; C. I. Acid Blue 1, 7, 9, 15, 22, 23, 25, 29, 40, 43, 59, 62, 74, 78, 80, 90, 100, 102, 104, 117, 127, 138, 158, 161; C. I. Reactive Blue 4, 5, 7, 13, 14, 15, 18, 19, 21, 26, 27, 29, 32, 38, 40, 44, 100; C. I. Direct Violet 107; C. I. Direct Black 17, 19, 22, 31, 32, 51, 62, 71, 74, 112, 113, 154, 168, 195; C. I. Acid Black 2, 48, 51, 52, 110, 115, 156; and C. I. Food Black 1, 2. The anionic dye as described above may be used singly. Alternatively, two or more of the anionic dyes as described above may be used in combination. The blending amount of the anionic dye is preferably 0.1 to 20% by weight, more preferably 0.3 to 15% by weight, and much more preferably 0.5 to 10% by weight with respect to the total amount of the ink containing the anionic dye.

The cationic dye is not specifically limited. The cationic dye may include, for example, C. I. Basic Yellow 1, 2, 11, 13, 14, 19, 21, 25, 32, 33, 36, 51: C. I. Basic Orange 2, 15, 21, 22; C. I. Basic Red 1, 2, 9, 12, 13, 37, 38, 39, 92; C. I. Basic Violet 1, 3, 7, 10, 14; C. I. Basic Blue 1, 3, 5, 7, 9, 19, 24, 25, 26, 28, 29, 45, 54, 65; C. I. Basic Green 1, 4; C. I. Basic Brown 1, 12; and C. I. Basic Black 2, 8. The cationic dye as described above may be used singly. Alternatively, two or more of the cationic dyes as described above may be used in combination. The blending amount of the cationic dye is preferably 0.1 to 10% by weight, and more preferably 0.2 to 3% by weight with respect to the total amount of the ink containing the cationic dye.

At least one of the ink containing the anionic dye and the ink containing the cationic dye contains at least two glycols selected from the group consisting of diethylene glycol, triethylene glycol, and polyethylene glycol. It is preferable that the at least two glycols selected from the group consisting of diethylene glycol, triethylene glycol, and polyethylene glycol are contained in the ink containing the anionic dye.

The anionic dye and the cationic dye, which are contained in the inks for constituting the water base ink set for ink-jet recording of the present invention, are dissociated into cation and anion respectively in an aqueous solution. Therefore, it is considered that the following phenomenon may occur. That is, when the water base ink containing the anionic dye and the water base ink containing the cationic dye are mixed with each other, then the anion in the anionic dye and the cation in the cationic dye may be attracted to one another in the mixed ink, and base materials of the dyes may be bonded to one another to produce any deposit. In general, the anion and the cation tend to be attracted to one another, and it is difficult to avoid the formation of deposit. However, it is considered that the deposit, which results from the dye, tends to appear from the organic solvent which is inferior in dye-dissolving ability, and the dye-dissolving ability is inversely proportional to the tendency of appearance of the deposit, probably for the following reason. That is, it is considered that the intensity to surround the dye differs depending on the solvent.

In view of the above, as a result of diligent and repeated investigations performed by the present inventors for the solvent having a high dye-dissolving ability capable of suppressing the formation of deposit, the present inventors have found out diethylene glycol, triethylene glycol, and polyethylene glycol as the solvent which is extremely excellent in ability to dissolve the anionic dye and the cationic dye. It is considered that the dye is preferably surrounded owing to the size of molecule and the ratio of hydrocarbon group and hydroxyl group possessed by the glycols as described above. Further, it has been found out that a greater effect is obtained when two or more of the glycols, which have different numbers of monomer units, are contained. It is not known exactly on which the glycol exhibits the effect more preferably, the anionic dye or the cationic dye. However, when the anionic dye and the cationic dye are mixed with each other, the glycol acts on any one of the dyes or both of the dyes. Thus, it is possible to remarkably suppress the formation of deposit from the ink.

It is preferable that the blending amount of the two glycols selected from the group consisting of diethylene glycol, triethylene glycol, and polyethylene glycol is 10 to 45% by weight with respect to the total amount of the ink containing the anionic dye and/or the ink containing the cationic dye. If the blending amount is less than 10% by weight, it is feared that any deposit may be formed when the ink containing the anionic dye and the ink containing the cationic dye are mixed with each other or when volatile components in the ink are evaporated. If the blending amount exceeds 45% by weight, any inconvenience arises in relation to the discharge performance and the maintenance performance, because the viscosity is high after the evaporation of volatile components. When polyethylene glycol is selected, it is preferable that the average molecular weight of polyethylene glycol is 200 to 600. If the average molecular weight is less than 200, it is considered that the intensity to surround the dye is lowered. As a result, any deposit is formed in some cases when the ink containing the anionic dye and the ink containing the cationic dye are mixed with each other. If the average molecular weight exceeds 600, the viscosity is high after the evaporation of volatile components. As a result, any inconvenience arises in relation to the discharge performance and the maintenance performance in some cases. More preferably, the average molecular weight is 200 to 300.

The ink containing the anionic dye and/or the ink containing the cationic dye contains polyvinyl pyrrolidone. It is especially preferable that the polyvinyl pyrrolidone is contained in the ink containing the anionic dye. The present inventors have found out that the use of the glycol makes it possible to suppress the deposit from the ink. However, the effect is insufficient depending on the type of the dye. As a result of further diligent and repeated investigations performed by the present inventors, it has been found out that the deposition can be suppressed more effectively when a water-soluble high molecular weight compound, especially polyvinyl pyrrolidone is further added to the ink solvent. Thus, the present invention has been completed. It is considered that the polyvinyl pyrrolidone causes the hydration phenomenon together with water molecules in the ink to form the cluster, and thus it is further difficult for the anionic dye and the cationic dye surrounded by the glycol to make bonding.

It is preferable that the blending amount of polyvinyl pyrrolidone is 0.1 to 5% by weight with respect to the total amount of the ink containing the anionic dye and/or the ink containing the cationic dye. If the blending amount is less than 0.1% by weight, it is considered that the intensity to surround the dye is lowered. As a result, any deposit is formed in some cases when the ink containing the anionic dye and the ink containing the cationic dye are mixed with each other. If the blending amount exceeds 5% by weight, the viscosity is high after the evaporation of volatile compounds. As a result, any inconvenience arises in relation to the discharge performance and the maintenance performance in some cases. The blending amount is more preferably 0.3 to 3% by weight, and much more preferably 0.5 to 1.5% by weight. It is preferable that the average molecular weight of polyvinyl pyrrolidone is 2000 to 20000. If the average molecular weight is less than 2000, it is considered that the intensity to surround the dye is lowered. As a result, any deposit is formed in some cases when the ink containing the anionic dye and the ink containing the cationic dye are mixed with each other. If the average molecular weight exceeds 20000, the viscosity is high after the evaporation of volatile compounds. As a result, any inconvenience arises in relation to the discharge performance and the maintenance performance in some cases. More preferably, the average molecular weight is 2000 to 3000.

The water is not specifically limited. However, it is preferable to use deionized water (pure water). It is preferable that the blending amount of water is not less than 40% by weight with respect to the total amount of the ink containing and anionic dye and/or the ink containing the cationic dye in order to maintain a low viscosity of the ink so that the ink is normally discharged.

The ink, which is used for the water base ink set for ink-jet recording of the present invention, may contain a moistening agent and a permeating agent. The moistening agent is added principally in order to avoid any dry-up of the ink and any deposition of ink components at the tip of the ink-jet head. The moistening agent is not specifically limited. The moistening agent may include, for example, polyalkylene glycols; alkylene glycols such as ethylene glycol, propylene glycol, butylene glycol, dipropylene glycol, tripropylene glycol, 1,2,6-hexanetriol, thiodiglycol, 1,3-butanediol, 1,5-pentanediol, and hexylene glycol; glycerol; and pyrrolidones such as 2-pyrrolidone and N-methyl-2-pyrrolidone. The moistening agent may be used singly. Alternatively, two or more of the moistening agents may be used in combination.

The glycol, which is selected from the group consisting of diethylene glycol, triethylene glycol, and polyethylene glycol, has a property as the moistening agent. It is unnecessary to use the moistening agent in combination for the ink containing the glycol. However, it is also possible to use the glycol and the moistening agent in combination. When the glycol and the moistening agent are used in combination, it is preferable that the blending amount of the glycol and the moistening agent is 10 to 45% by weight with respect to the total amount of the ink. If the blending amount is less than 10% by weight, then the moistening action is insufficient, and problems arise in some cases concerning the deposition of ink components and the dry-up of the ink. If the blending amount exceeds 45% by weight, then the viscosity of the ink is unnecessarily increased, and any harmful influence is exerted on the discharge performance of the ink in some cases. When the moistening agent is added to the ink containing no glycol, it is preferable that the blending amount thereof is 5 to 50% by weight with respect to the total amount of the ink. If the blending amount is less than 5% by weight, then the moistening action is insufficient, and problems arise in some cases concerning the deposition of ink components and the dry-up of the ink. If the blending amount exceeds 50% by weight, then the viscosity of the ink is unnecessarily increased, and problems arise, for example, such that the ink cannot be discharged and/or the ink is dried extremely slowly on the recording paper. More preferably, the blending amount is 10 to 40% by weight.

The permeating agent is added in order to quicken the drying of the ink on the paper surface by accelerating the permeation speed of the ink into the recording paper so that the bleeding and the feathering are avoided. The bleeding means the blurring at the boundary between different colors on the recording paper. The feathering means the whisker-like blurring along the paper fiber caused by the permeation of the ink. It is preferable to use, as the permeating agent, polyvalent alcohol monoalkyl ether having low odor and having a low vapor pressure. The polyvalent alcohol monoalkyl ether is not specifically limited. However, those preferably usable include, for example, diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, and tripropylene glycol monobutyl ether.

It is preferable that the blending amount of the polyvalent alcohol alkyl ether is 2 to 20% by weight with respect to the total amount of the ink to be used in the present invention. If the blending amount is less than 2% by weight, problems arise in some cases concerning the blurring and the drying time of the ink on the recording paper, because the permeation speed of the ink into the recording paper is slow. If the blending amount exceeds 20% by weight, then the ink arrives at the back surface of the recording paper in some cases, and the problem of blurring arises in other cases, because the ink excessively permeates into the recording paper.

It is also possible to use monovalent alcohol such as ethanol and isopropyl alcohol for the ink to be used in the present invention, in order to control the drying performance and the permeation performance of the ink into the recording paper. Further, if necessary, it is also possible to use, for example, conventionally known resin binders, water-soluble high molecular weight compounds other than polyvinyl pyrrolidone, surfactants, viscosity-adjusting agents, surface tension-adjusting agents, pH-adjusting agents, dye-dissolving agents, and antiseptic and fungicidal agents. When the ink to be used in the present invention is applied to the ink-jet recording method in which the ink is discharged in accordance with the action of the thermal energy, for example, thermal physical property values including, for example, the specific heat, the coefficient of thermal expansion, and the coefficient of thermal conductivity are adjusted in some cases.

The water base ink set for ink-jet recording of the present invention is generally composed of inks of four colors, i.e., black, yellow, magenta, and cyan, when a full color image is obtained. However, the water base ink set may include inks of not less than five colors or not more than three colors.

As described above, the problems involved in the conventional technique have been sufficiently solved by the water base ink set for ink-jet recording of the present invention. The problem such as the deposition of dye is not caused even when the ink containing the anionic dye and the ink containing the cationic dye are mixed with each other.

When a color image is formed by means of the ink-jet recording method of the present invention, for example, there are prepared the ink containers filled with the inks containing the cationic dyes and the ink containers filled with the inks containing the anionic dyes for the inks of black, yellow, magenta, and cyan respectively. The ink containers are used while exchanging the respective ink containers for the four recording heads. According to the recording method of the present invention, when the recording is performed with one color by using a monocolor printer having one head, and the recording is continuously performed with another color thereafter, then no deposit is formed even when one is the anionic dye ink and the other is the cationic dye ink.

As described above, the problems involved in the conventional technique have been sufficiently solved in the ink-jet recording method of the present invention. No deposit is produced even when the anionic dye ink and the cationic dye ink are mixed with each other. Therefore, even when the recording is performed with the cationic dye ink after performing the recording with the anionic dye ink, or when the recording is performed with the anionic dye ink after performing the recording with the cationic dye ink, then the clog-up is avoided at the head filter and the nozzle without performing any treatment such as the substitution of the interior of the head with a washing solution or the like. Thus, it is possible to realize the highly reliable and highly accurate recording owing to the highly accurate discharge landing control.

The present invention will be explained in further detail below as exemplified by Examples. However, the present invention is not limited to only Examples. Inks having the following respective compositions were prepared, and they were used as ink sets for ink-jet recording.

EXAMPLE A1

Black Ink Composition

C. I. Food Black 2: 1.0% by weight;

Polyethylene glycol (weight average molecular weight: 200): 19.0% by weight;

Diethylene glycol: 9.0% by weight;
Polyvinyl pyrrolidone (weight average molecular weight: 2500): 1.0% by weight;
Triethylene glycol monobutyl ether: 5.0% by weight;
Pure water: 65.0% by weight.
Yellow Ink Composition
C. I. Basic Yellow 40: 0.8% by weight;
Polyethylene glycol (weight average molecular weight: 200): 14.0% by weight;
2-Pyrrolidone: 17.0% by weight;
Diethylene glycol monomethyl ether: 3.0% by weight;
Pure water: 65.2% by weight.
Magenta Ink Composition
C. I. Acid Red 52: 1.0% by weight;
Polyethylene glycol (weight average molecular weight: 200): 12.0% by weight;
Triethylene glycol: 14.0% by weight;
Polyvinyl pyrrolidone (weight average molecular weight: 2500): 1.0% by weight;
Triethylene glycol monobutyl ether: 2.0% by weight;
Pure water: 70.0% by weight.
Cyan Ink Composition
C. I. Basic Blue 3: 0.8% by weight;
Glycerol: 14.0% by weight;
Polyethylene glycol (weight average molecular weight: 200): 10.0% by weight;
Triethylene glycol monobutyl ether: 6.0% by weight;
Pure water: 69.2% by weight.

EXAMPLE A2

Black Ink Composition
C. I. Food Black 2: 0.8% by weight;
Polyethylene glycol (weight average molecular weight: 300): 20.0% by weight;
Triethylene glycol: 5.0% by weight;
Diethylene glycol: 5.0% by weight;
Polyvinyl pyrrolidone (weight average molecular weight: 2500): 0.6% by weight;
Diethylene glycol monoisobutyl ether: 3.0% by weight;
Pure water: 65.6% by weight.
Yellow Ink Composition
C. I. Basic Yellow 19: 0.5% by weight;
Polyethylene glycol (weight average molecular weight: 200): 14.0% by weight;
2-Pyrrolidone: 17.0% by weight;
Diethylene glycol monoisobutyl ether: 3.0% by weight;
Pure water: 65.5% by weight.
Magenta Ink Composition
C. I. Basic Red 1: 0.5% by weight;
Polyethylene glycol (weight average molecular weight: 200): 14.0% by weight;
2-Pyrrolidone: 17.0% by weight;
Triethylene glycol monobutyl ether: 4.0% by weight;
Pure water: 64.5% by weight.
Cyan Ink Composition
C. I. Basic Blue 9: 1.0% by weight;
Polyethylene glycol (weight average molecular weight: 200): 15.0% by weight;
Diethylene glycol: 8.0% by weight;
Polyvinyl pyrrolidone (weight average molecular weight: 2500): 1.4% by weight;
Triethylene glycol monobutyl ether: 4.0% by weight;
Pure water: 70.6% by weight.

EXAMPLE A3

Black Ink Composition
C. I. Food Black 2: 0.5% by weight;
Polyethylene glycol (weight average molecular weight: 300): 12.0% by weight;
Diethylene glycol: 15.0% by weight;
Polyvinyl pyrrolidone (weight average molecular weight: 2500): 0.7% by weight;
Diethylene glycol monoisobutyl ether: 2.0% by weight;
Pure water: 69.8% by weight.
Yellow Ink Composition
C. I. Basic Yellow 2: 0.5% by weight;
Polyethylene glycol (weight average molecular weight: 200): 14.0% by weight;
2-Pyrrolidone: 17.0% by weight;
Diethylene glycol monoisobutyl ether: 4.0% by weight;
Pure water: 64.5% by weight.
Magenta Ink Composition
C. I. Acid Red 52: 1.0% by weight;
Polyethylene glycol (weight average molecular weight: 200): 19.2% by weight;
Triethylene glycol: 9.0% by weight;
Polyvinyl pyrrolidone (weight average molecular weight: 2500): 0.9% by weight;
Triethylene glycol monobutyl ether: 5.0% by weight;
Pure water: 64.9% by weight.
Cyan Ink Composition
C. I. Acid Blue 9: 1.5% by weight;
Polyethylene glycol (weight average molecular weight: 300): 17.0% by weight;
Diethylene glycol: 12.0% by weight;
Polyvinyl pyrrolidone (weight average molecular weight: 2500): 0.5% by weight;
Triethylene glycol monobutyl ether: 4.0% by weight;
Pure water: 65.0% by weight.

EXAMPLE A4

Black Ink Composition
C. I. Basic Black 2: 0.6% by weight;
Glycerol: 16.0% by weight;
2-Pyrrolidone: 12.0% by weight;
Diethylene glycol monoisobutyl ether: 5.0% by weight;
Pure water: 66.4% by weight.
Yellow Ink Composition
C. I. Basic Yellow 1: 0.5% by weight;
Glycerol: 16.0% by weight;
2-Pyrrolidone: 12.0% by weight;
Triethylene glycol monobutyl ether: 4.0% by weight;
Pure water: 67.5% by weight.
Magenta Ink Composition
C. I. Direct Violet 107: 1.0% by weight;
Polyethylene glycol (weight average molecular weight: 300): 23.0% by weight;
Triethylene glycol: 6.0% by weight;

Polyvinyl pyrrolidone (weight average molecular weight: 2500): 1.2% by weight;
Diethylene glycol monoisobutyl ether: 2.0% by weight;
Pure water: 66.8% by weight.
Cyan Ink Composition
C. I. Basic Blue 1: 0.4% by weight;
Polyethylene glycol (weight average molecular weight: 200): 14.0% by weight;
2-Pyrrolidone: 17.0% by weight;
Triethylene glycol monobutyl ether: 3.0% by weight;
Pure water: 65.6% by weight.

COMPARATIVE EXAMPLE A1

Black Ink Composition
C. I. Direct Black 154: 0.5% by weight;
Polyethylene glycol (weight average molecular weight: 300): 19.2% by weight;
Glycerol: 6.0% by weight;
Polyvinyl pyrrolidone (weight average molecular weight: 2500): 0.9% by weight;
Diethylene glycol monoisobutyl ether: 3.0% by weight;
Pure water: 70.4% by weight.
Yellow Ink Composition
C. I. Basic Yellow 1: 0.4% by weight;
Glycerol: 19.0% by weight;
Diethylene glycol: 10.0% by weight;
Triethylene glycol monobutyl ether: 5.0% by weight;
Pure water: 75.6% by weight.
Magenta Ink Composition
C. I. Acid Red 289: 1.0% by weight;
Polyethylene glycol (weight average molecular weight: 200): 19.2% by weight;
Diethylene glycol: 9.0% by weight;
Glycerol: 0.9% by weight;
Diethylene glycol monoisobutyl ether: 3.0% by weight;
Pure water: 66.9% by weight.
Cyan Ink Composition
C. I. Acid Blue 9: 1.5% by weight;
Glycerol: 19.2% by weight;
Triethylene glycol: 6.0% by weight;
Polyvinyl pyrrolidone (weight average molecular weight: 2500): 0.3% by weight;
Diethylene glycol monoisobutyl ether: 2.0% by weight;
Pure water: 68.0% by weight.

COMPARATIVE EXAMPLE A2

Black Ink Composition
C. I. Basic Black 2: 0.6% by weight;
Glycerol: 16.0% by weight;
2-Pyrrolidone: 12.0% by weight;
Diethylene glycol monomethyl ether: 5.0% by weight;
Pure water: 66.4% by weight.
Yellow Ink Composition
C. I. Basic Yellow 1: 0.4% by weight;
Polyethylene glycol (weight average molecular weight: 200): 14.0% by weight;
2-Pyrrolidone: 17.0% by weight;
Diethylene glycol monoisobutyl ether: 3.0% by weight;
Pure water: 65.6% by weight.
Magenta Ink Composition
C. I. Acid Red 52: 1.0% by weight;
Polyethylene glycol (weight average molecular weight: 200): 19.0% by weight;
Diethylene glycol: 8.0% by weight;
Triethylene glycol monobutyl ether: 5.0% by weight;
Pure water: 67.0% by weight.
Cyan Ink Composition
C. I. Direct Blue 199: 1.5% by weight;
2-Pyrrolidone: 19.2% by weight;
Diethylene glycol: 9.0% by weight;
Polyvinyl pyrrolidone (weight average molecular weight: 2500): 0.9% by weight;
Diethylene glycol monoisobutyl ether: 2.0% by weight;
Pure water: 64.4% by weight.

COMPARATIVE EXAMPLE A3

Black Ink Composition
C. I. Basic Black 2: 0.6% by weight;
Glycerol: 16.0% by weight;
2-Pyrrolidone: 12.0% by weight;
Triethylene glycol monobutyl ether: 4.0% by weight;
Pure water: 67.4% by weight.
Yellow Ink Composition
C. I. Basic Yellow 2: 0.6% by weight;
Glycerol: 16.0% by weight;
2-Pyrrolidone: 12.0% by weight;
Triethylene glycol monobutyl ether: 3.0% by weight;
Pure water: 68.4% by weight.
Magenta Ink Composition
C. I. Acid Red 52: 1.0% by weight;
Polyethylene glycol (weight average molecular weight: 300): 19.2% by weight;
2-Pyrrolidone: 9.0% by weight;
Polyvinyl pyrrolidone (weight average molecular weight: 2500): 0.9% by weight;
Diethylene glycol monoisobutyl ether: 2.0% by weight;
Pure water: 67.9% by weight.
Cyan Ink Composition
C. I. Basic Blue 9: 0.4% by weight;
Glycerol: 16.0% by weight;
2-Pyrrolidone: 12.0% by weight;
Diethylene glycol monoisobutyl ether: 3.0% by weight;
Pure water: 68.6% by weight.

Evaluation of Performance

The respective ink materials were sufficiently mixed and agitated for the ink sets prepared in Examples A1 to A4 and COMPARATIVE EXAMPLES A1 to A3 respectively, followed by performing filtration with a membrane filter of 0.2 µm to use the ink sets for the evaluation.

Evaluation 1: Evaluation of Discharge

A multi-head of the on-demand type (discharge orifice diameter: 40 µm: driving voltage: 30 volts, frequency: 10 kHz), in which the recording was performed by generating liquid droplets by applying the pressure based on the piezo-electric element vibration to the ink in the recording head, was used for the discharge machine. In the evaluation test, the recording was continued simultaneously with the four colors until the inks in the cartridges were exhausted. When the discharge failure in which the ink was not discharged was observed, and/or when the bending in which the discharge direction was deviated was observed, then the purge operation (to forcibly discharge the ink by applying the negative pressure to the ink discharge section) was performed to confirm the degree of restoration therefrom. The evaluation was made in accordance with the following criterion. +: neither discharge failure nor bending appeared at all to the end. ±: the discharge failure and the bending slightly appeared, but they were restored by means of the purge operation. −: the discharge failure and the bending appeared, and they were not restored by means of the purge operation.

Evaluation 2: Microscopic Observation of Discharge Section of Printer

The discharge section of the printer was microscopically observed after the evaluation of discharge was carried out as described above. The evaluation was made in accordance with the following criterion. +: no deposit was observed. −: any deposit was confirmed. Obtained results are shown in Table 1.

TABLE 1

|  | Evaluation of discharge | Microscopic observation |
| --- | --- | --- |
| Example A1 | + | + |
| Example A2 | + | + |
| Example A3 | + | + |
| Example A4 | ± | + |
| Comparative Example A1 | − | − |
| Comparative Example A2 | − | − |
| Comparative Example A3 | − | − |

As shown in Table 1, any clog-up, which would be otherwise caused by the formation of deposit, was not caused at the discharge section in the case of the ink sets prepared in respective Examples. As a result of the microscopic observation, the deposit was confirmed at the discharge section of the printer based on the use of the ink set in which the evaluation of discharge was "−". No deposit was observed in the other printers.

In order to carry out the ink-jet recording method of the present invention, anionic dye inks having the following compositions were prepared.

EXAMPLE B1

Anionic Dye Black Ink Composition

C. I. Food Black 2: 0.7% by weight;
Polyethylene glycol (weight average molecular weight: 200): 12.0% by weight;
Diethylene glycol: 15.0% by weight;
Polyvinyl pyrrolidone (weight average molecular weight: 2500): 0.7% by weight;
Dipropylene glycol monobutyl ether: 3.0% by weight;
Pure water: 68.6% by weight.

EXAMPLE B2

Anionic Dye Black Ink Composition

C. I. Food Black 2: 0.5% by weight;
Polyethylene glycol (weight average molecular weight: 200): 25.0% by weight;
Diethylene glycol: 5.0% by weight;
Polyvinyl pyrrolidone (weight average molecular weight: 2500): 0.6% by weight;
Triethylene glycol monobutyl ether: 2.0% by weight;
Pure water: 66.9% by weight.

EXAMPLE B3

Anionic Dye Yellow Ink Composition

C. I. Acid Yellow 23: 1.0% by weight;
Polyethylene glycol (weight average molecular weight: 200): 12.0% by weight;
Diethylene glycol: 14.0% by weight;
Polyvinyl pyrrolidone (weight average molecular weight: 2500): 1.0% by weight;
Triethylene glycol monobutyl ether: 3.0% by weight;
Pure water: 69.0% by weight.

EXAMPLE B4

Anionic Dye Yellow Ink Composition

C. I. Acid Yellow 23: 0.8% by weight;
Polyethylene glycol (weight average molecular weight: 200): 11.0% by weight;
Triethylene glycol: 8.0% by weight;
Polyvinyl pyrrolidone (weight average molecular weight: 2500): 1.0% by weight;
Dipropylene glycol monobutyl ether: 6.0% by weight;
Pure water: 73.2% by weight.

EXAMPLE B5

Anionic Dye Magenta Ink Composition

C. I. Acid Red 52: 1.0% by weight;
Polyethylene glycol (weight average molecular weight: 200): 12.0% by weight;
Diethylene glycol: 14.0% by weight;
Polyvinyl pyrrolidone (weight average molecular weight: 2500): 1.0% by weight;
Triethylene glycol monobutyl ether: 3.0% by weight;
Pure water: 69.0% by weight.

EXAMPLE B6

Anionic Dye Magenta Ink Composition

C. I. Acid Red 52: 1.0% by weight;
Polyethylene glycol (weight average molecular weight: 200): 19.2% by weight;
Diethylene glycol: 9.0% by weight;
Polyvinyl pyrrolidone (weight average molecular weight: 2500): 0.9% by weight;
Triethylene glycol monobutyl ether: 3.0% by weight;
Pure water: 66.9% by weight.

EXAMPLE B7

Anionic Dye Cyan Ink Composition

C. I. Acid Blue 9: 1.0% by weight;
Polyethylene glycol (weight average molecular weight: 200): 15.0% by weight;
Diethylene glycol: 8.0% by weight;
Polyvinyl pyrrolidone (weight average molecular weight: 2500): 1.4% by weight;
Diethylene glycol monomethyl ether: 3.0% by weight;
Pure water: 71.6% by weight.

EXAMPLE B8

Anionic Dye Cyan Ink Composition
C. I. Acid Blue 9: 2.0% by weight;

Polyethylene glycol (weight average molecular weight: 300): 19.0% by weight;
Diethylene glycol: 12.0% by weight;
Polyvinyl pyrrolidone (weight average molecular weight: 2500): 0.5% by weight;
Triethylene glycol monobutyl ether: 3.0% by weight;
Pure water: 63.5% by weight.

COMPARATIVE EXAMPLE B1

Anionic Dye Black Ink Composition
C. I. Direct Black 154: 0.5% by weight;
Polyethylene glycol (weight average molecular weight: 300): 19.2% by weight;
Glycerol: 6.0% by weight;
Polyvinyl pyrrolidone (weight average molecular weight: 2500): 0.9% by weight;
Diethylene glycol monomethyl ether: 4.0% by weight;
Pure water: 69.4% by weight.

COMPARATIVE EXAMPLE B2

Anionic Dye Black Ink Composition
C. I. Food Black 2: 0.5% by weight;
Polyethylene glycol (weight average molecular weight: 300): 19.2% by weight;
Glycerol: 6.0% by weight;
Polyvinyl pyrrolidone (weight average molecular weight: 2500): 0.9% by weight;
Diethylene glycol monomethyl ether: 4.0% by weight;
Pure water: 69.4% by weight.

COMPARATIVE EXAMPLE B3

Anionic Dye Yellow Ink Composition
C. I. Direct Yellow 88: 0.8% by weight;
Polyethylene glycol (weight average molecular weight: 200): 14.0% by weight;
2-Pyrrolidone: 17.0% by weight;
Diethylene glycol monomethyl ether: 3.0% by weight;
Pure water: 65.2% by weight.

COMPARATIVE EXAMPLE B4

Anionic Dye Yellow Ink Composition
C. I. Direct Yellow 11: 0.7% by weight;
Polyethylene glycol (weight average molecular weight: 200): 14.0% by weight;
2-Pyrrolidone: 15.0% by weight;
Diethylene glycol monomethyl ether: 2.0% by weight;
Pure water: 68.3% by weight.

COMPARATIVE EXAMPLE B5

Anionic Dye Magenta Ink Composition
C. I. Acid Red 52: 1.0% by weight;
Polyethylene glycol (weight average molecular weight: 200): 19.0% by weight;
Diethylene glycol: 8.0% by weight;
Diethylene glycol monomethyl ether: 4.0% by weight;
Pure water: 68.0% by weight.

COMPARATIVE EXAMPLE B6

Anionic Dye Magenta Ink Composition
C. I. Direct Red 9: 1.0% by weight;
Polyethylene glycol (weight average molecular weight: 200): 19.0% by weight;
Diethylene glycol: 8.0% by weight;
Diethylene glycol monomethyl ether: 4.0% by weight;
Pure water: 68.0% by weight.

COMPARATIVE EXAMPLE B7

Anionic Dye Cyan Ink Composition
C. I. Direct Blue 199: 1.5% by weight;
2-Pyrrolidone: 19.7% by weight;
Diethylene glycol: 9.0% by weight;
Polyvinyl pyrrolidone (weight average molecular weight: 2500): 0.9% by weight;
Diethylene glycol monomethyl ether: 2.0% by weight;
Pure water: 66.9% by weight.

COMPARATIVE EXAMPLE B8

Anionic Dye Cyan Ink Composition
C. I. Acid Blue 9: 1.0% by weight;
2-Pyrrolidone: 19.7% by weight;
Diethylene glycol: 9.5% by weight;
Polyvinyl pyrrolidone (weight average molecular weight: 2500): 0.9% by weight;
Diethylene glycol monomethyl ether: 2.0% by weight;
Pure water: 66.9% by weight.

Cationic dye inks, which were used for the evaluation in combination with the anionic dye inks described above in the evaluation of discharge and the evaluation of mixing as described later on, were prepared on the basis of the following compositions.

Cationic Dye Black Ink Composition 1
C. I. Basic Black 2: 0.6% by weight;
Glycerol: 16.0% by weight;
2-Pyrrolidone: 12.0% by weight;
Triethylene glycol monobutyl ether: 5.0% by weight;
Pure water: 66.4% by weight.

Cationic Dye Black Ink Composition 2
C. I. Basic Black 2: 0.6% by weight;
Glycerol: 16.0% by weight;
2-Pyrrolidone: 12.0% by weight;
Diethylene glycol monomethyl ether: 3.0% by weight;
Pure water: 68.4% by weight.

Cationic Dye Yellow Ink Composition 1
C. I. Basic Yellow 40: 0.4% by weight;
Polyethylene glycol (weight average molecular weight: 200): 14.0% by weight;
Triethylene glycol: 3.0% by weight;
2-Pyrrolidone: 17.0% by weight;
Dipropylene glycol monobutyl ether: 4.0% by weight;
Pure water: 61.6% by weight.

Cationic Dye Yellow Ink Composition 2
C. I. Basic Yellow 1: 0.5% by weight;
Glycerol: 16.0% by weight;
2-Pyrrolidone: 12.0% by weight;
Triethylene glycol monobutyl ether: 5.0% by weight;
Pure water: 66.5% by weight.

Cationic Dye Magenta Ink Composition 1
C. I. Basic Red 1: 0.5% by weight;
Polyethylene glycol (weight average molecular weight: 200): 14.0% by weight;

Triethylene glycol: 2.0% by weight;
2-Pyrrolidone: 17.0% by weight;
Diethylene glycol monomethyl ether: 3.0% by weight;
Pure water: 63.5% by weight.
Cationic Dye Magenta Ink Composition 2
C. I. Basic Red 1: 0.5% by weight;
Polyethylene glycol (weight average molecular weight: 200): 14.0% by weight;
2-Pyrrolidone: 17.0% by weight;
Triethylene glycol monobutyl ether: 2.0% by weight;
Pure water: 66.5% by weight.
Cationic Dye Cyan Ink Composition 1
C. I. Basic Blue 3: 0.5% by weight;
Glycerol: 14.0% by weight;
Polyethylene glycol (weight average molecular weight: 200): 10.0% by weight;
Dipropylene glycol monobutyl ether: 5.0% by weight;
Pure water: 70.5% by weight.
Cationic Dye Cyan Ink Composition 2
C. I. Basic Blue 1: 0.4% by weight;
Polyethylene glycol (weight average molecular weight: 200): 14.0% by weight;
2-Pyrrolidone: 17.0% by weight;
Diethylene glycol monoethyl ether: 2.0% by weight;
Pure water: 66.6% by weight.

Evaluation of Performance

The respective ink materials were sufficiently mixed and agitated for the inks having the compositions as described above, followed by performing filtration with a membrane filter of 0.2 µm to use the inks for the evaluation of performance.

Evaluation 1: Evaluation of Discharge

A multi-head of the on-demand type (discharge orifice diameter: 40 µm: driving voltage: 30 V, frequency: 10 kHz), in which the recording was performed by generating liquid droplets by applying the pressure based on the piezoelectric element vibration to the ink in the recording head, was used for the discharge machine. The discharge test was performed as follows. That is, the discharge was performed by using the discharge machine connected with the ink container filled with the cationic dye ink having the composition as described above. After that, the ink container, which had been filled with the cationic dye ink having the composition as described above, was detached, and the ink container, which was filled with the anionic dye ink, was connected to the discharge machine. The discharge test was carried out until the ink in the ink container filled with the anionic dye ink was exhausted, or until the discharge machine failed to continue the discharge due to any clog-up at the nozzle. When there was any inconvenience in the discharge test, for example, when any discharge failure in which the ink was not discharged was caused, and when any bending in which the discharge direction was deflected was caused, then the restoration was made by means of the purge operation or the like such that the negative pressure was applied to the ink discharge section to forcibly discharge the ink from the ink discharge section. The evaluation was made in accordance with the following criterion. ++: neither discharge failure nor bending was caused at all. +: the discharge failure and the bending were marginally caused, but the restoration was made by means of the purge operation or the like. ±: the discharge failure and the bending were caused, and the restoration was not made by means of the purge operation or the like. −: no discharge was effected from almost all of the nozzles, and the restoration was not made by means of the purge operation or the like. Obtained results are shown in Table 2.

TABLE 2

| | Cationic dye ink | | | | | | | |
|---|---|---|---|---|---|---|---|---|
| | Black | | Yellow | | Magenta | | Cyan | |
| | 1 | 2 | 1 | 2 | 1 | 2 | 1 | 2 |
| Anionic dye ink | | | | | | | | |
| Black | | | | | | | | |
| Example B1 | ++ | + | + | ++ | + | + | + | ++ |
| Example B2 | + | ++ | + | ++ | ++ | + | ++ | + |
| Comp. Ex. B1 | ± | ± | ± | − | − | ± | − | ± |
| Comp. Ex. B2 | ± | ± | ± | − | − | − | − | − |
| Yellow | | | | | | | | |
| Example B3 | + | ++ | + | + | + | + | + | + |
| Example B4 | ++ | ++ | ++ | + | + | + | ++ | + |
| Comp. Ex. B3 | − | − | − | − | − | − | − | − |
| Comp. Ex. B4 | − | − | − | − | ± | ± | ± | − |
| Magenta | | | | | | | | |
| Example B5 | + | ++ | + | + | + | + | + | + |
| Example B6 | ++ | + | ++ | + | ++ | + | ++ | + |
| Comp. Ex. B5 | − | − | − | − | ± | − | − | ± |
| Comp. Ex. B6 | − | − | − | − | − | − | ± | − |
| Cyan | | | | | | | | |
| Example B7 | ++ | ++ | + | + | + | + | + | ++ |
| Example B8 | + | + | ++ | + | ++ | + | + | + |
| Comp. Ex. B7 | ± | ± | ± | − | − | − | − | − |
| Comp. Ex. B8 | ± | ± | ± | − | − | ± | ± | ± |

Evaluation 2: Evaluation of Mixing

The anionic dye inks prepared in Examples B1 to B8 and Comparative Examples B1 to B8 described above were mixed with the cationic dye inks having the foregoing compositions respectively, and then the presence or absence of deposit formation was microscopically observed to make the evaluation. The evaluation was made in accordance with the following criterion. +: no deposit was observed at all. ±: a little amount of deposit was observed. −: a large amount of deposit was observed. Obtained results are shown in Table 3.

TABLE 3

| | Cationic dye ink | | | | | | | |
|---|---|---|---|---|---|---|---|---|
| | Black | | Yellow | | Magenta | | Cyan | |
| | 1 | 2 | 1 | 2 | 1 | 2 | 1 | 2 |
| Anionic dye ink | | | | | | | | |
| Black | | | | | | | | |
| Example B1 | + | + | + | + | + | + | + | + |
| Example B2 | + | + | + | + | + | + | + | + |
| Comp. Ex. B1 | ± | ± | ± | − | − | ± | − | ± |
| Comp. Ex. B2 | ± | ± | ± | − | − | − | − | − |
| Yellow | | | | | | | | |
| Example B3 | + | + | + | + | + | + | + | + |
| Example B4 | + | + | + | + | + | + | + | + |
| Comp. Ex. B3 | − | − | − | − | − | − | − | − |
| Comp. Ex. B4 | − | − | − | − | ± | ± | ± | − |

TABLE 3-continued

|  | Cationic dye ink | | | | | | | |
|---|---|---|---|---|---|---|---|---|
|  | Black | | Yellow | | Magenta | | Cyan | |
|  | 1 | 2 | 1 | 2 | 1 | 2 | 1 | 2 |
| Magenta |  |  |  |  |  |  |  |  |
| Example B5 | + | + | + | + | + | + | + | + |
| Example B6 | + | + | + | + | + | + | + | + |
| Comp. Ex. B5 | − | − | − | − | ± | − | − | ± |
| Comp. Ex. B6 | − | − | − | − | − | − | ± | − |
| Cyan |  |  |  |  |  |  |  |  |
| Example B7 | + | + | + | + | + | + | + | + |
| Example B8 | + | + | + | + | + | + | + | + |
| Comp. Ex. B7 | ± | ± | ± | − | − | − | − | − |
| Comp. Ex. B8 | ± | ± | ± | − | − | ± | ± | ± |

As shown in Tables 2 and 3, no deposit is formed even when the anionic dye ink prepared in each of Examples of the present invention is mixed with the cationic dye ink. Therefore, no clog-up occurs at the head filter and the nozzle even when the container filled with the anionic dye ink and the container filled with the cationic dye ink are used while exchanging them with each other. Thus, it is possible to control the discharge landing highly accurately.

As for the water base ink set for ink-jet recording of the present invention, even when the ink containing the anionic dye and the ink containing the cationic dye are used in combination, then no clog-up is caused at the head discharge portion to successfully perform the stable discharge, and the recording is successfully performed highly reliably and highly accurately with vividness and good color balance.

As for the ink-jet recording method of the present invention, even when the anionic dye ink and the cationic dye ink are used in combination, then the stable discharge is successfully performed without causing any clog-up at the head filter and the nozzle, and the recording is successfully performed highly reliably and highly accurately.

An embodiment of an ink jet printer as an ink-jet recording apparatus in accordance with the invention will be described as below with reference to the accompanying drawings.

As shown in FIG. 1, a color ink jet printer 100 includes four ink cartridges (ink set) 61, each of which contains a respective color of ink, such as cyan, magenta, yellow and black ink, a head unit 63 having an ink jet printer head 6 (hereinafter referred to as a head 6) for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink prepared in the above examples A or B can be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 1.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles (described later) formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

To prevent ink from drying, a cap 85 is provided to cover the nozzles 15 (FIG. 2) in the head 6 mounted on the carriage 64 when it returns to the reset position after printing.

Figure 2:
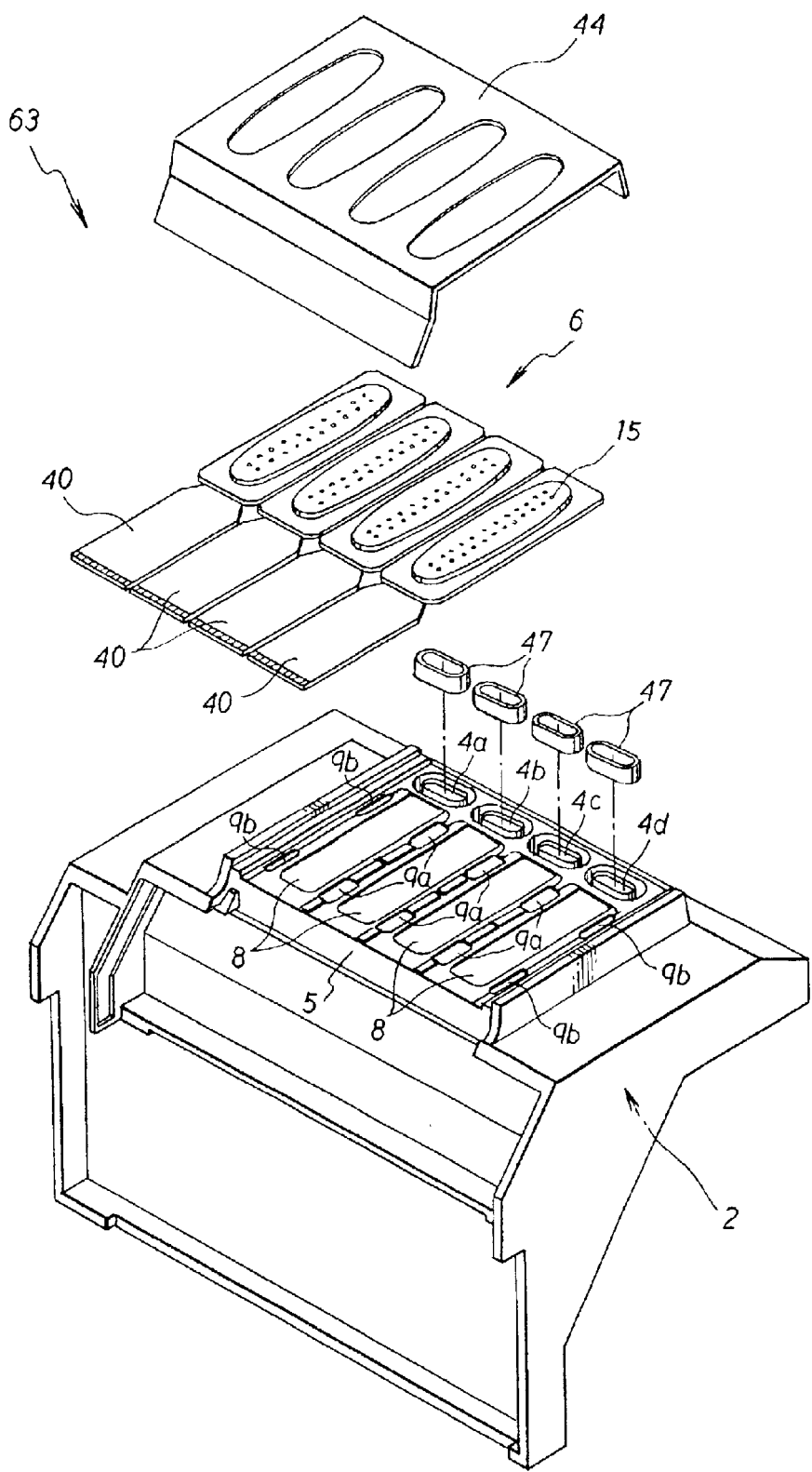
FIG. 2 is a perspective view of a head unit, with its nozzles facing upward.

As shown in FIG. 2, the head unit 63 is mounted on the carriage 64 that moves along the sheet 62 and has a substantially box shape with upper open structure. The head unit 63 has a cover plate 44 made of an elastic thin metallic plate. The cover plate 44 is fixed at the front surface of the head unit 63 and covers the head unit 63 when the head 6 is removed. The head unit 63 also has a mounting portion 2 on which the four ink cartridges 61 are detachably attached from above. Ink supply paths 4a, 4b, 4c, 4d, each of which connects respective ink discharge portions of each ink cartridge 61, communicate with a bottom of a bottom plate 5 of the head unit 63. Each of the ink supply paths 4a, 4b, 4c, 4d is provided with a rubber packing 47 to intimately contact an ink supply hole 19a.

The head 6 is constructed from four blocks that are arranged in parallel to each other. On the underside of the bottom plate 5, four stepped supports 8 are formed to receive the respective blocks of the head 6. In the bottom plate 5, a plurality of recesses 9a, 9b, which are filled with an UV adhesive to bond the respective blocks of the head 6, are formed to penetrate the bottom plate 5.

Figure 3:
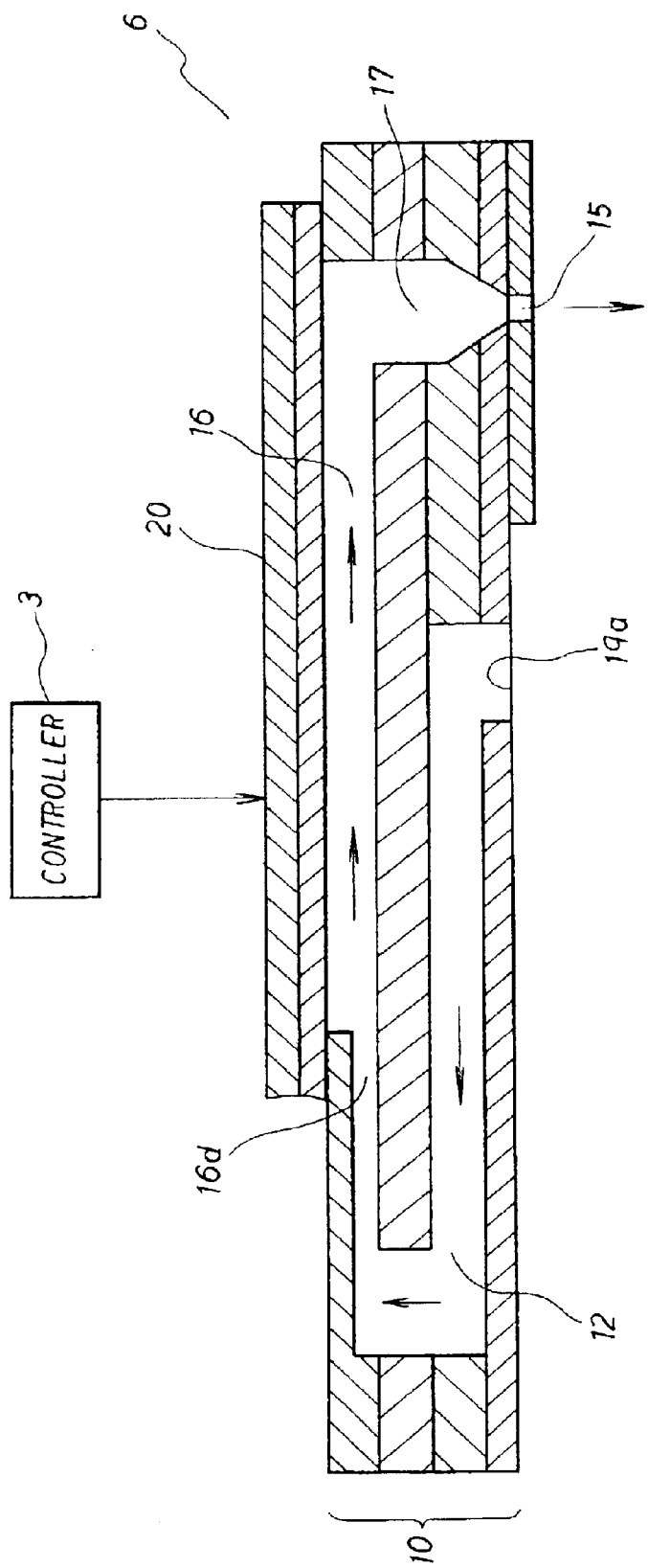
FIG. 3 is a schematic diagram showing the ink jet print head and a controller.

FIG. 3 is a sectional view showing one of the pressure chambers in the head 6. A plurality of pressure chambers 16 are provided in the head 6. The nozzles 15 communicating the respective pressure chambers 16 are provided substantially in line in one surface of the head 6.

As shown in FIG. 3, the head 6 is constructed by the cavity plate 10 and the piezoelectric actuator 20. The cavity plate 10 has the ink supply holes 19a connected with the ink cartridge 61, the manifolds 12, the narrowed portions 16d, the pressure chambers 16, the through holes 17 and the nozzles 15, which communicate with each other. While the ink supply hole 19a opens toward the ejecting direction of the nozzle 15 in FIG. 3 for convenience, the ink supply hole 19a actually opens toward the piezoelectric actuator 20.

A controller 3 provides a prestored driving pulse to the piezoelectric actuator 20 by superimposing the driving pulse on a clock signal. The driving pulse can be controlled with a technique disclosed in, for example, U.S. Pat. Nos. 6,312,089, 6,412,923 B1 and 6,760,959. Further, the detailed structure of the printer and controlling method of the head unit are also disclosed in these U.S. patents, a content of which has been incorporated herein by reference.

According to the present invention, it is possible to provide a cartridge (or cartridges) which accommodates the ink set prepared in Examples A1, A2, A3 or A4, for the printer as described above as an accessory to a printer package.

Figure 4:
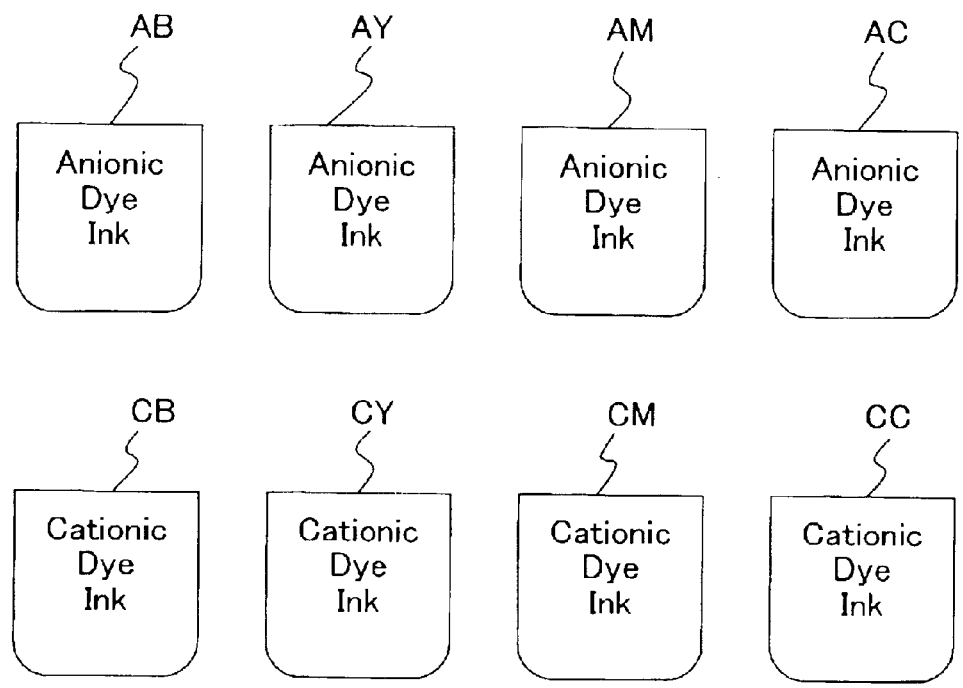
FIG. 4 is a schematic diagram showing a cartridge kit having four anionic dye ink cartridges and four cationic dye ink cartridges.

Further, according to the present invention, it is possible to provide one cartridge which accommodates at least one ink of the inks prepared in Examples B1 to B8, and other cartridge which has the same color as that of the one ink of the inks prepared in Examples B1 to B8 and which accommodates the cationic dye ink prepared in Example B, for the printer as described above as an accessory to the printer package. For example, as shown in FIG. 4, it is possible to provide four ink cartridges (AB, AY, AM and AC) which accommodate the inks prepared in Examples B1, B3, B5 and B7, respectively, and other four ink cartridges (CB, CY, CM and CC) which accommodate the cationic dye inks, namely Black 1, Yellow 1, Magenta 1 and Cyan 1 listed in Table 2, respectively, for the printer as an accessory to the printer or as a cartridge kit. In this case, the operator of the printer may suitably use the respective ink cartridges in combination.

What is claimed is:

1. Water base inks for ink-jet recording comprising:
a first ink which contains an anionic dye; and
a second ink which contains a cationic dye, wherein:
at least one of the first and second inks contains at least two glycols selected from the group consisting of diethylene glycol, triethylene glycol, and polyethylene glycol polyvinyl pyrrolidone, and water so that deposit formation is suppressed when the first ink containing the anionic dye is mixed with the second ink containing the cationic dye.

2. The water base inks for ink-jet recording according to claim 1, wherein the first ink and the second ink have different colors.

3. The water base inks for ink-jet recording according to claim 2, wherein the second ink has a yellow color.

4. The water base inks for ink-jet recording according to claim 3, wherein the first ink has a black, magenta, or cyan color.

5. The water base inks for ink-jet recording according to claim 4, further comprising third and fourth inks, wherein the first to fourth inks have mutually different colors.

6. The water base inks for ink jet recording according to claim 1, wherein the first ink contains the at least two glycols selected from the group consisting of diethylene glycol, triethylene glycol, and polyethylene glycol, polyvinyl pyrrolidone, and water.

7. A water base ink set for ink-jet recording comprising:
a first ink which contains an anionic dye; and
a second ink which contains a cationic dye, wherein:
at least one of the first and second inks contains at least two glycols select from the group consisting of diethylene glycol, triethylene glycol, and polyethylene glycol, polyvinyl pyrrolidone, and water, wherein the first ink and the second ink have an identical color.

8. The water base ink set for ink-jet recording according to claim 7, further comprising a third ink which contains an anionic dye having a color different from that of the first ink, and a fourth ink which contains a cationic dye having the same color as that of the third ink, wherein at least one of the third and fourth inks contains at least two glycols selected from the group consisting of diethylene glycol, triethylene glycol, and polyethylene glycol, polyvinyl pyrrolidone, and water.

9. The water base ink set for ink-jet recording according to claim 7, wherein the second ink has a yellow color.

10. An ink-jet recording apparatus comprising:
an ink-jet head which ejects an ink onto a recording medium;
a carnage which holds the ink-jet head and which is movable opposingly with respect to the recording medium; and
water base inks for ink-jet recording, wherein:
the inks comprise a first ink which contains an anionic dye, and a second ink which contains a cationic dye, and at least one of the first and second inks contains at least two glycols selected from the group consisting of diethylene glycol, triethylene glycol, and polyethylene glycol, polyvinyl pyrrolidone, and water so that deposit formation is suppressed when the first ink containing the anionic dye is mixed with the second ink containing the cationic dye.

11. The ink-jet recording apparatus according to claim 10, wherein the inks are in a form of ink cartridge which is connectable to the ink-jet head and which is exchangeable.

12. The ink-jet recording apparatus according to claim 10, wherein the first ink and the second ink have different colors.

13. The ink-jet recording apparatus according to claim 12, wherein the second ink has a yellow color.

14. The ink-jet recording apparatus according to claim 10, further comprising third and fourth inks, wherein the first to fourth inks have mutually different colors.

15. The ink-jet recording apparatus according to claim 10, wherein the first ink contains the at least two glycols selected from the group consisting of diethylene glycol, triethylene glycol, and polyethylene glycol, polyvinyl pyrrolidone, and water.

16. An ink-jet recording apparatus comprising:
an ink-jet head which ejects an ink onto a recording medium;
a carriage which holds the ink-jet head and which is movable opposingly with respect to the recording medium; and
an water base ink set for ink-jet recording, wherein:
the ink set comprises a first ink which contains an anionic dye, and a second ink which contains a cationic dye, and at least one of the first and second inks contains at least two glycols selected from the group consisting of diethylene glycol, triethylene glycol, and polyethylene glycol, polyvinyl pyrrolidone, and water, wherein the first ink and the second ink have an identical color.

17. The ink-jet recording apparatus according to claim 16, wherein the second ink has a yellow color.

18. An ink-jet recording method for discharging an ink contained in an ink container onto a recording medium from an ink-jet head, the method comprising:
performing recoding by connecting, to the ink-jet head, one of a first ink container filled with a first ink containing an anionic dye and a second ink container filled with a second ink containing a cationic dye; and
performing recording by connecting, to the ink-jet headh the other of the first and second ink containers in place of the one ink container, wherein:
at least one of the first and second inks contains at least two glycols selected from the group consisting of diethylene glycol, triethylene glycol, and polyethylene glycol, polyvinyl pyrrolidone, and water so that deposit formation is suppressed when the first ink containing the anionic dye is mixed with the second ink containing the cationic dye.

19. An ink-jet recording method for discharging an ink contained in an ink container onto a recording medium from an ink-jet head, the method comprising:

performing recording by connecting, to the ink-jet head, one of a first ink container filled with a first ink containing an anionic dye and a second ink container filled with a second ink containing a cationic dye; and performing recording by connecting, to the ink-jet head, the other of the first and second ink containers in place of the one ink container, wherein:

at least one of the first and second inks contains at least two glycols selected from the group consisting of diethylene glycol, triethylene glycol, and polyethylene glycol, polyvinyl pyrrolidone, and water, wherein the first ink and the second ink have an identical color.

* * * * *